United States Patent [19]

Ohmura

[11] Patent Number: 4,953,648

[45] Date of Patent: Sep. 4, 1990

[54] REAR WHEEL STEERING APPARATUS

[75] Inventor: Hiroshi Ohmura, Hiroshima, Japan

[73] Assignee: Mazda Motor Corporation, Hiroshima, Japan

[21] Appl. No.: 472,403

[22] Filed: Feb. 1, 1990

Related U.S. Application Data

[63] Continuation of Ser. No. 335,355, Apr. 10, 1989, abandoned.

[30] Foreign Application Priority Data

Apr. 8, 1988 [JP] Japan .................... 63-85371

[51] Int. Cl.$^5$ ............................. B62D 5/04
[52] U.S. Cl. .................... 180/79.1; 280/91;
180/140; 180/142; 192/0.07; 192/48.2
[58] Field of Search ............. 180/79.1, 140, 142;
280/91; 192/0.07, 48.2

[56] References Cited

U.S. PATENT DOCUMENTS 2,903,110  9/1959  Moody ........................ 192/48.2
4,601,357  7/1986  Miyoshi et al. .................. 180/140

FOREIGN PATENT DOCUMENTS 0227565  12/1984  Japan .......................... 280/91
0080172   4/1987  Japan ......................... 180/140

Primary Examiner—Charles A. Marmor
Assistant Examiner—Mitchell Bompey
Attorney, Agent, or Firm—Wegner & Bretschneider

[57] ABSTRACT

A rear wheel steering mechanism for steering rear wheels of the vehicle is urged by a spring so as to allow the rear wheels to take a neutral position or a position at which the rear wheels run in a straight direction. Control over the driving of the motor connected to the rear wheel steering mechanism allows the rear wheels to be steered at a given steered angle against the urging force of the spring. The rear wheels are always returned to the neutral position by the spring by disconnecting a clutch interposed between the rear wheel steering mechanism and the motor whenever abnormality is found. Presence or absence of abnormality in a drive control system of the motor is checked or an alignment of a reference position of the motor is made, in such a state that the clutch is disconnected, immediately after an ignition switch was turned on yet prior to control of the rear wheel steering.

27 Claims, 13 Drawing Sheets

REAR WHEEL STEERING APPARATUS

This application is a continuation of U.S. application Ser. No. 07/335,355, filed Apr. 10, 1989, now abandoned.

BACKGROUND OF THE INVENTION

1. Field of the Invention

The present invention relates to a rear wheel steering apparatus.

2. Description of Related Art

There is a vehicle of a so-called 4WS (four wheel steering) in which the rear wheels are steered together with the front wheels.

In the four wheel steering, the rear wheel steering mechanism may be divided into two types, a mechanical type in which the rear wheel steering mechanism is mechanically connected to a front wheel steering mechanism as disclosed in Japanese Utility Model Publication (kokai) No. 25,275/1987 and an electromagnetic type in which the rear wheels are steered by a driving force of an electromagnetic drive means such as, for example, an electric motor, in association with the rear wheel steering mechanism. In the rear wheel steering mechanism of the electromagnetic type, a deceleration mechanism is interposed between the drive means and the rear wheel steering mechanism to minimize a capacity of the drive means as small as possible, as shown in Japanese Utility Model Publication (kokai) No. 25,277/987.

The rear wheel steering mechanism of the electric type is such that the rear wheels are exclusively steered electrically so that a sufficient attention should be paid to a fail safe measure against a trouble with a control system. As disclosed in Japanese Patent Publication (kokai) No. 202,977/1986, a neutral holding means is provided on the rear wheel steering mechanism in order to constantly urge the rear wheel steering mechanism toward a neutral position. This arrangement is based on the concept that, if a trouble would occur in a control system, a control over the rear wheel steering is suspended and the rear wheels are forcibly returned to the neutral position.

In the electrical control by the motor over the rear wheel steering, an accuracy of the control is the issue. If a drive control system of the motor including the motor itself would become defective, the rear wheels could not be steered at a desired angle and it is dangerous to drive the vehicle in such a situation.

It is the matter of course that a position at which the motor is rotated should be accurately determined when the rear wheels are steered by the motor. A sensor is separately mounted for sensing the position of the motor rotated and the drive control over the motor is carried out while monitoring the rotational position of the motor through the sensor. If there would be a discrepancy between the actual rotational position of the motor and the output of the sensor, an accurate control over the rear wheel steering could not be made.

SUMMARY OF THE INVENTION

Therefore, the present invention has the object to provide a rear wheel steering apparatus for a vehicle adapted to monitor in advance whether the rear wheel steering by the motor is continued to be implemented from the start of running the vehicle.

In order to achieve the above object, the present invention consists of a rear wheel steering apparatus, as shown as a block diagram in FIG. 12, which comprises:

a rear wheel steering mechanism for steering rear wheels;

a neutral holding means for holding the rear wheel steering mechanism always at a neutral position, which is connected to the rear wheel steering mechanism;

a motor as a driving source connected to the rear wheel steering mechanism and arranged for displacing the rear wheel steering mechanism in resistance to the neutral holding means;

a clutch being interposed between the rear wheel steering mechanism and the motor and arranged for connecting or disconnecting the rear wheel steering mechanism to or from the motor;

a start detecting means for detecting the turning of an ignition switch on; and an initial check means for carrying out an initial check of a drive control system of the motor including the motor by disconnecting the clutch when the start detecting means detects that the ignition switch is turned on.

In accordance with the present invention, whether or not the drive control system of the motor including the motor is in normal order is inspected in advance prior to the start of the engine. Particularly this inspection may be made while a connection of the motor to the rear wheel steering mechanism is blocked, thus permitting a check or inspection without a large load to be produced on the motor. It is further to be noted that, as the rear wheels are always held at the neutral position by the neutral holding means in such a state that the connection of the motor to the rear wheel steering mechanism is blocked, the check be carried out with the premise that the rear wheels are at the neutral position.

When it has been found at the time of an initial check or inspection that the motor and the drive control system of the motor is in order, the clutch is again connected and the rear wheels are steered by the motor. The control over the rear wheel steering can then be resumed. This resumption can be made by the construction of the rear wheel steering apparatus as shown as a block diagram in FIG. 13, which comprises:

a rear wheel steering mechanism for steering rear wheels;

a neutral holding means for holding the rear wheel steering mechanism always at a neutral position, which is connected to the rear wheel steering mechanism;

a motor as a driving source connected to the rear wheel steering mechanism and arranged for displacing the rear wheel steering mechanism in resistance to the neutral holding means;

a clutch being interposed between the rear wheel steering mechanism and the motor and arranged for connecting or disconnecting the rear wheel steering mechanism to or from the motor;

a start detecting means for detecting the turning of an ignition switch on;

an initial check means for carrying out an initial check of a drive control system of the motor including the motor by disconnecting the clutch when the start detecting means detects that the ignition switch is turned on; and a drive control means for controlling drive of the motor so as to allow a steered angle of the rear wheels to reach a target steered angle of the rear wheels determined in accordance with a predetermined condition;

in which the intial check means is set to re-connect the clutch when the drive control system is found to be in good order; and the drive control means is operated subsequent to the re-connection of the clutch after the drive control system is found to be in order.

It is further to be noted that the alignment of a reference position of the motor with the reference position of the rotational position detecting means for detecting the rotational position of the motor is carried out by the construction as shown as a block diagram in FIG. 14, which comprises:

a rear wheel steering mechanism for steering rear wheels;

a neutral holding means for holding the rear wheel steering mechanism always at a neutral position, which is connected to the rear wheel steering mechanism;

a motor as a driving source connected to the rear wheel steering mechanism and arranged for displacing the rear wheel steering mechanism in resistance to the neutral holding means;

a clutch being interposed between the rear wheel steering mechanism and the motor and arranged for connecting or disconnecting the rear wheel steering mechanism to or from the motor;

a start detecting means for detecting the turning of an ignition switch on;

an initial check means for carrying out an initial check of a drive control system of the motor including the motor by disconnecting the clutch when the start detecting means detects that the ignition switch is turned on;

a drive control means for controlling drive of the motor so as to allow a steered angle of the rear wheels to reach a target steered angle of the rear wheels determined in accordance with a predetermined condition; and a rotational position detecting means for detecting a rotational position of the motor;

in which the initial check means is set to re-connect the clutch subsequent to alignment of a reference rotational position of the motor with a reference rotational position of the rotational position detecting means to be made after the clutch is disconnected; and the drive control means is operated subsequent to the re-connection cf the clutch by the initial check means.

In this case, the rear wheels are always held at the neutral position by the neutral holding means on account of disconnection of the clutches so that the alignment may be carried out readily and accurately.

When there is nothing wrong with the motor itself as well as the drive control system of the motor, or if the alignment of the reference positions was finished, then the clutches may be coupled again and the rear wheel steering control by the motor can be resumed.

If the motor itself or its drive control system is found defective or out of order, or if the alignment of the reference rotational positions between the motor and the rotational position detecting means, the clutches are kept decoupled, inhibiting the rear wheel steering control. In addition of decoupling the clutches, a servo lock may also be utilized to securely hold the rear wheels at the neutral position. More preferably, a brake may be disposed for locking the motor at a desired rotational position, thus substituting the brake for the servo lock in order to hold the rear wheels at the neutral position more securely. This substitution may serve as saving electricity to be otherwise consumed.

The other objects, features and advantages of the invention will become apparent in the course of the description which follows in conjunction with the accompanying drawings.

DETAILED DESCRIPTION OF THE PREFERRED EMBODIMENTS

Figure 1:
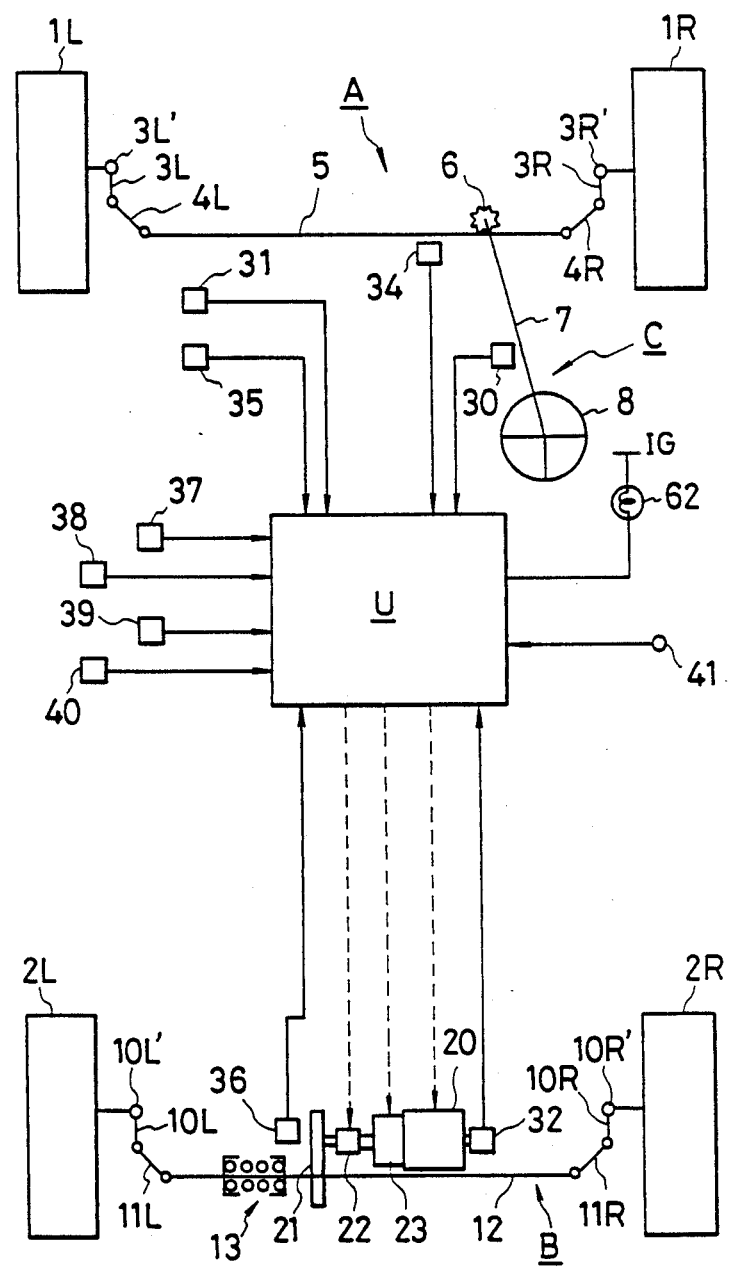
FIG. 1 is a schematic diagram showing an overal system of one example in accordance with the present invention.

Referring to FIG. 1, a right-hand front wheel 1R is connected to a left-hand front wheel 1L through a front wheel steering mechanism A, while a right-hand rear wheel 2R is connected to a left-hand rear wheel 2L through a rear wheel steering mechanism B.

The front wheel steering mechanism A may comprise a pair of right-hand and left-hand knuckle arms 3R and 3L as well as a pair of right-hand and left-hand tie rods 4R and 4L, respectively, and the right-hand tie rod 4R is connected to the left-hand tie rod 4L through a relay rod 5. To the front steering mechanism A is connected a steering mechanism C which, in turn, may be of a rack-and-pinion type in which a pinion 6 is connected through a shaft 7 to a steering wheel 8. This connection permits a displacement of the relay rod 5 to the left in FIG. 1 when the steering wheel 8 is steered to the right, thus turning the right-hand and left-hand knuckle arms 3R and 3L about their respective pivotal centers 3R' and 3L' in a clockwise direction in the drawing in proportion to an amount in which the steering wheel 8 is steered, namely, in proportion to a steered angle of the steering wheel 8, and then eventually steering the right-hand and left-hand front wheels 1R and 1L. Likewise, the right-hand and left-hand front wheels 1R and 1L are steered in a counterclockwise direction in the drawing in accordance with an amount in which the steering wheel 8 is steered to the left.

Figure 3:
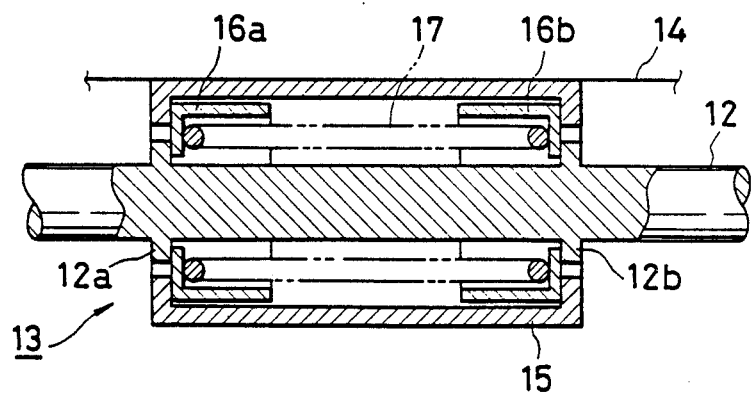
FIG. 3 is an enlarged cross-sectional view showing the neutral holding means.

Like the front wheel steering mechanism A, the rear wheel steering mechanism B may comprise a pair of right-hand and left-hand knuckle arms 10R and 10L and a Pair of right-hand and left-hand tie rods 11R and 11L, respectively. The right-hand tie ròd 11R is then connected to the left-hand tie rod 11L through a relay rod 12 which, in turn, is provided with a neutral holding means 13. As shown specifically in FIG. 3, the neutral holding means 13 is provided with a casing 15 fixed to a vehicle body 14 and a compression spring 17 which is mounted between a pair of spring mountings 16a and 16b loosely inserted in the casing 15. The relay rod 12 extends through the casing 15 and is provided with a pair of flange portions 12a and 12b in a spaced relationship and the flange portions 12a and 12b serve as receiving the spring mountings 16a and 16b, respectively, so as to allow the compression spring 17 to constantly urge the relay rod 12 toward a neutral position. The compression spring 17 used should have a spring force to resist a side force during cornering.

Figure 2:
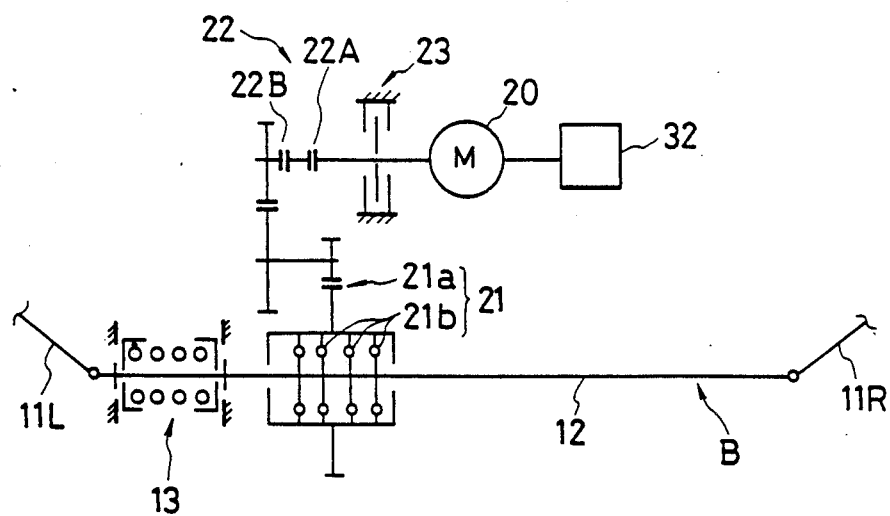
FIG. 2 is a schematic diagram showing the detail of the connection of the rear wheel steering mechanism to the motor.

As shown in FIG. 1, the rear wheel steering mechanism B is connected to a servo motor 20 which is a drive source for driving the rear wheels 2R and 2L. As specifically shown in FIG. 2, a deceleration mechanism 21 comprising a geartrain 21a and a ball screw 21b is disposed on the side of the relay rod 12 and connected to a clutch 22a. To the clutch 22a, in turn, is connected a brake mechanism 23 on the side of the servo motor 20. This arrangement permits a mechanical disconnection of the servo motor 20 with the rear wheel steerring mechanism B by operation of the clutch 22 and locking the rotation of a output shaft of the servo motor 20 by gripping the output shaft thereof by the brake mechanism 23.

The clutch 22 consists of a first clutch 22A and a second clutch 22B, both being of the electromagnetic type and being disposed in a series with each other. The first clutch 22A is of a normal open type, i.e., which is decoupled when it is deenergized while the second clutch 22B is of a normal closed type, i.e., which is coupled when it is deenergized. The arrangement for the clutch 21 enables the servo motor 20 to be disconnected from the rear wheel steering mechanism B, even when one of the first and second clutches 21A and 21B does not work. thus ensuring a neutral position by means of a neutral holding means 13.

When the clutch 22 is in a connected state, on the one hand, the rotation of the servo motor 20 in a normal direction displaces the relay rod 12 toward a left direction in FIG. 1, thus turning the knuckle arms 10R and 10L about their respective centers 10R' and 10L' in a clockwise direction in the drawing in proportion to a amount of the rotation of the servo motor 20. If the servo motor 20 is rotated in a reverse direction, the relay rod 12 is displaced to the right as shown in FIG. 1, thus steering the knuckle arms 10R and 10L about their repective centers 10R' and 10L' in a counterclockwise direction in the drawing in proportion to the amount of the reverse rotation of the servo motor 20.

When the clutch 22 is in a disconnectd state, on the other hand, the right-hand and left-hand rear wheels 2R and 2L are forced to be returned to a neutral position and held at the neutral position by the neutral holding means 13. In other words, while the clutch 22 is decoupled, only the front wheels 1R and 1L are steered, namely, the vehicle is in a 2WS (two-wheel-steering) state.

Figure 4:
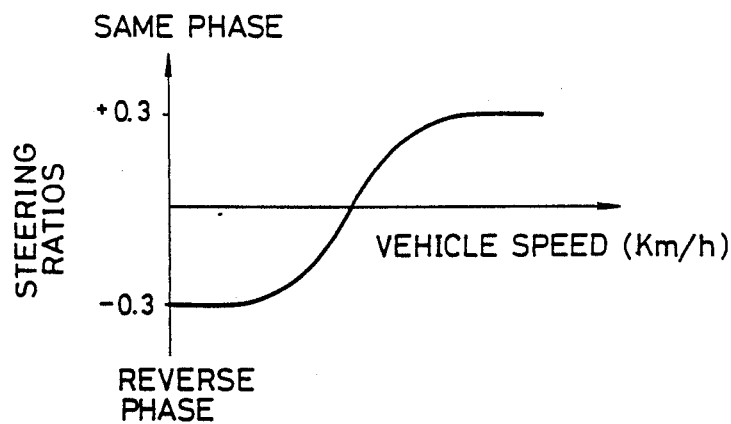
FIG. 4 is a graph showing a control characteristic of the vehicle speed-sensitive type for one example of the rear wheel steering.
Figure 5:
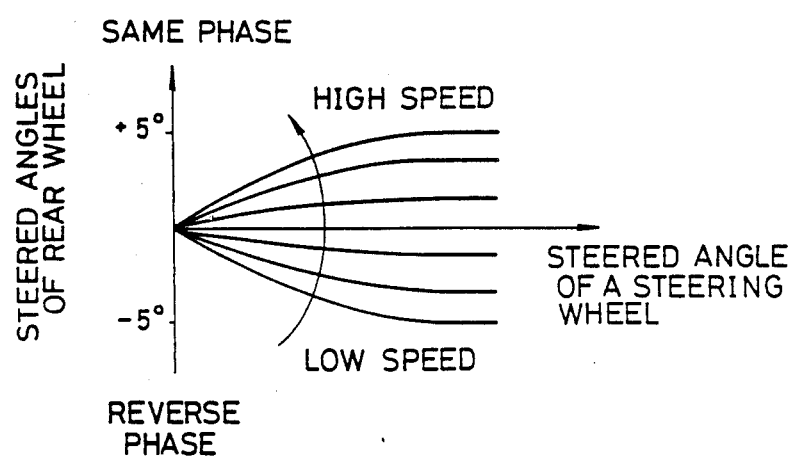
FIG. 5 is a graph showing characteristics to be varied with vehicle speeds.

Control over the rear wheel steering is so sensitive to a vehicle speed that, as shown in FIG. 4 as one example, a steered angle of the rear wheel against the steered angle of a steering wheel is changed from the reverse phase direction to the same phase direction as a vehicle speed increases as shown in FIG. 5. In order to conduct this control, a control unit U may basically receive signals from a first steered-angle sensing sensor 30 for sensing a steered angle of a steering wheel, a first vehicle speed sensing sensor 31, and an encorder 32 for detecting a rotational position of the servo motor 20, compute a target steered angle of the rear wheel on the basis of the steered angle of the steering wheel and the vehicle speed, and generate to the servo motor 20 a control signal corresponding to a desired amount of the rear wheel to be steered. Furthermore, the encorder 32 always monitors whether operation of the servo motor 20 is appropriately carried out for steering the respective right-hand and left-hand rear wheels 2R and 2L under feedback control.

The above basic control is in a double construction for the purpose of a fail safe by adding a second steered-angle sensing sensor 34 for sensing a steered angle of the front wheel to the first steered-angle sensing sensor 30, a second vehicle speed sensing sensor 35 to the first vehicle speed sensor 31, and a rear-wheel steered-angle sensing sensor 36 for detecting a mechanical displacement of a member on the side proximate the relay rod 12 rather than the clutch 22. The rear wheel steering is effected only when the corresponding two sensors of the sensors 30 to 36 detect the value identical to each other. In other words, for instance, if the first vehicle speed sensing sensor 31 would detect a value different from that sensed by the second vehicle speed sensing sensor 35, there should be a trouble so that the right-hand and left-hand rear wheels 2R and 2L are held in a neutral state by control to be carried out at the time of a fail mode as will be described hereinbelow.

In order to detect a variety of troubles, the control unit U is designed to receive ON/OFF signals from switches 37 to 40 and further a signal representing the presence or absence of electricity from an L terminal of an alternator. The switch 37 is a neutral clutch switch, the switch 38 is an inhibitor switch, and the switch 39 is a brake switch, and the switch 40 is an engine switch. The neutral switch 37 is designed so as to generate an OFF signal when a shift position of a manual transmission is shifted to the neutral position, namely, when a clutch pedal is pressed. The inhibitor switch 38 is such that an ON signal is generated when an automatic transmission is shifted to the speed range "N" or "P" while an OFF signal is produced when it is shifted to the speed range "D". The brake switch 39 is designed to generate an ON signal when the braking pedal is pressed. And the engine switch 40 generates an ON signal when the engine is in a driving state.

Figure 6:
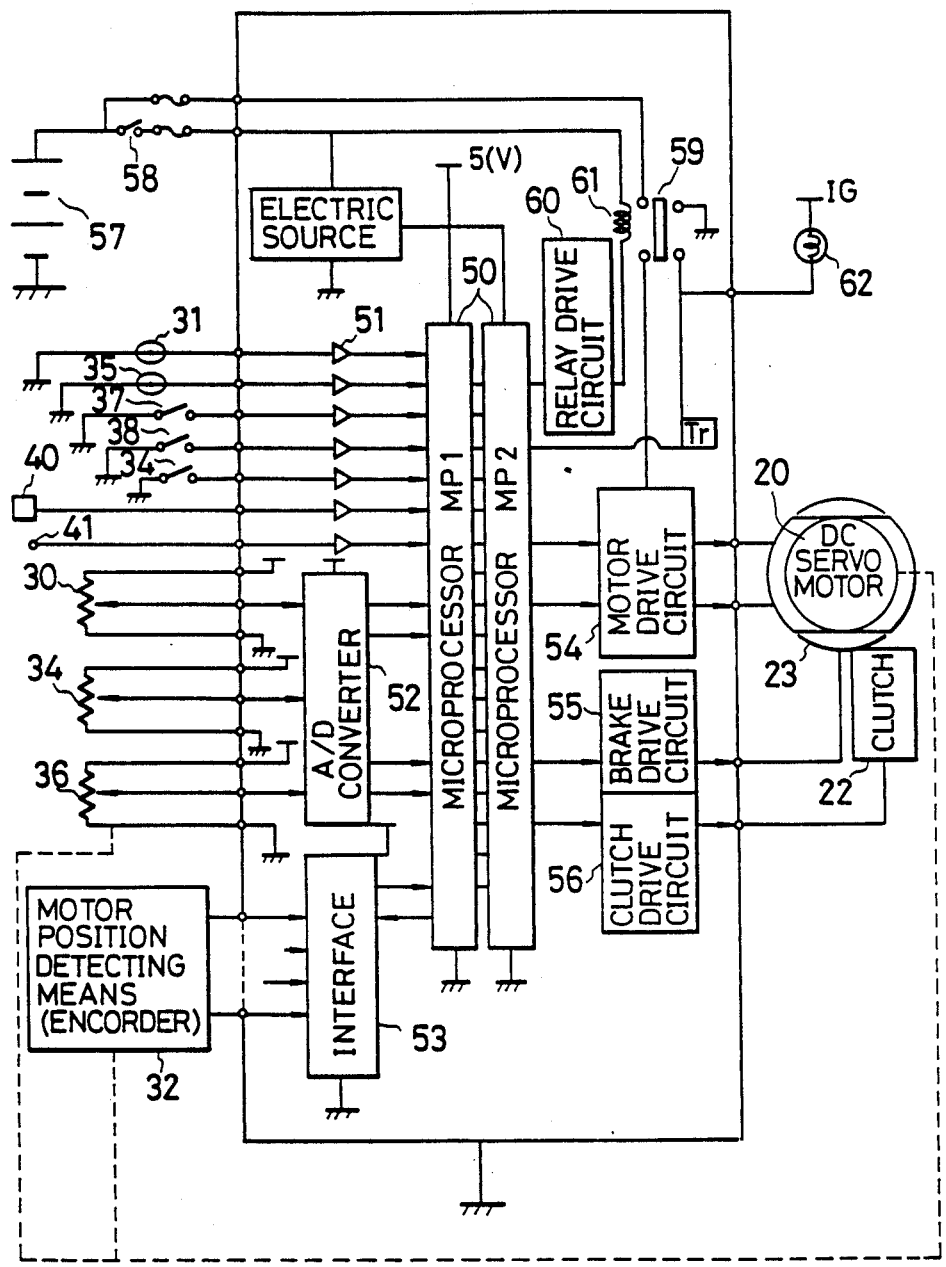
FIG. 6 is a block diagram showing a control system according to one example.
Figure 7:
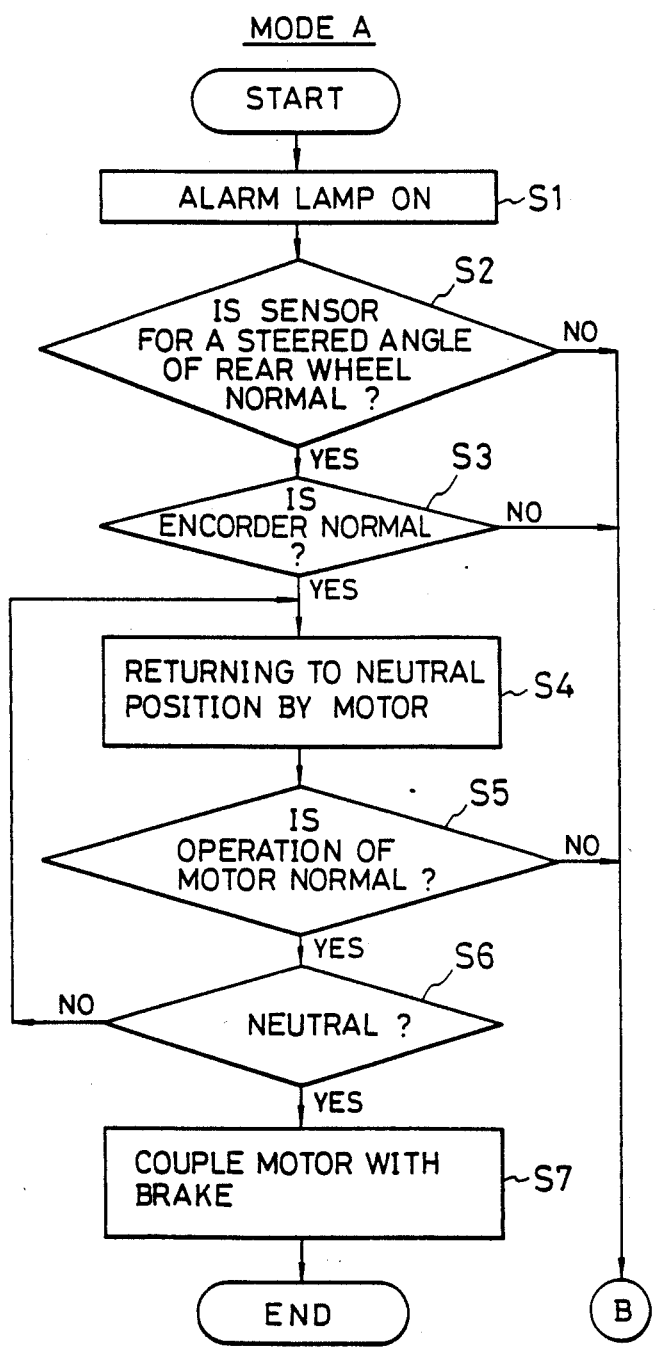
FIGS. 7 to 10 are each a flowchart showing a control example in accordance with the present invention.
Figure 8:
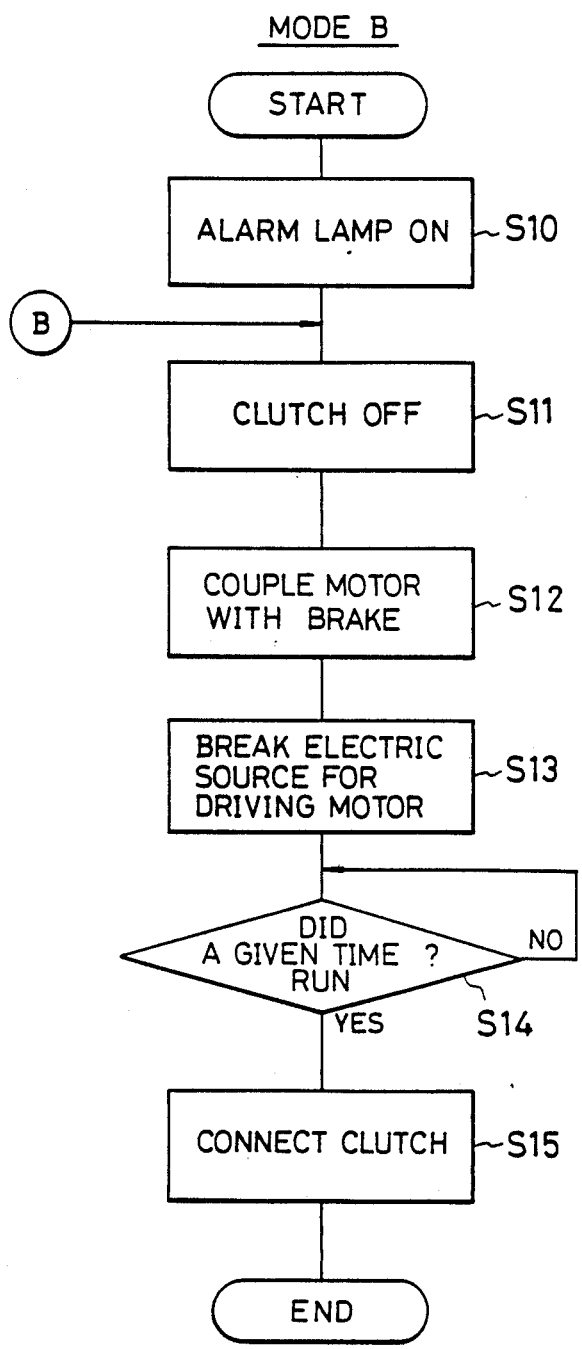

Referring to FIG. 6 directed to a block diagram showing the above control system, a microprocessor 50 comprises two microprocessors MP1 and MP2 which is designed so as to receive signals from the first and second vehicle speed sensing sensors 31 and 35, the switches 37 to 40, and the L terminal 41 of the alternator through a buffer 51, signals from the sensors 30, 34, and 36 through an A/D converter 52, and a signal from the encorder 32 through an interface 53. Signals generated by the microprocessor 50 are supplied to a motor brake 23 through a brake drive circuit and to a clutch 22 through a clutch drive circuit 56. The rear wheel steering control is carried out for the first time only when at least a signal from the L terminal 41 of the alternator becomes "High (Hi)".

In the drawing, reference numeral 57 denotes a battery, reference numeral 58 denotes an ignition key switch, and reference numeral 59 denotes a relay. If a trouble would occur with a control system for the rear wheel steering, application of electricity to a coil 61 is suspended by operation of a relay drive circuit 60, thus closing a B joint of the relay 59 and turning an alarm lamp on.

In this embodiment, measures will be taken in two modes in accordance with a location where a trouble occurs.

Mode A (First Fail Mode)

The mode A is a mode in which the right-hand and left-hand rear wheels 2R and 2L are still to be controlled and their respective positions are to be decided. In other words, if the rear wheels 2R and 2L could be returned to the neutral position by the servo motor 20, the operation of returning the rear wheels 2R and 2L to the neutral position is carried out by driving the servo motor 20 after the alarm lamp 62 was turned on and thereafter the motor brake 23 is coupled.

Mode B (Second Fail Mode)

The mode B is a mode in which the right-hand and left-hand rear wheels 2R and 2L cannot be controlled and their respective wheel positions cannot be decided any more. In this mode, after the alarm lamp 62 was turned on, the clutch 22 is disconnected and then the servo motor 62 is disconnected from the rear wheel steering mechanism B. Thereafter, the rear wheels 2R and 2L are returned to the neutral position by a spring action of the neutral holding means 13 and the clutch 22 is connected. Preferably, the motor brake 23 is coupled after the clutch 22 was disconnected. This may immediately restrict the rear wheels 2R and 2L physically from steering in consequence upon the uncontrollable rotation of the motor 20 and thereafter the application of electricity from the electric source to the motor 20 is blocked.

Troubles which may occur in various systems can be competed with alternatively in accordance with the above modes.

Vehicle speed signal system:

If it were decided that the vehicle speed signal system was out of order, measures are taken to compete with the trouble with the vehicle speed signal system in accordance with the mode A.

More specifically, this decision is made that an error would occur in the amount of alteration on the first vehicle speed sensing sensor 31 when the brake switch 39 is OFF and the first vehicle speed sensing sensor 31 detects a degree of deceleration expressed by $|dV_1/dt| > a$ (constant) (where $V_1$ denotes a vehicle speed detected by the first vehicle speed sensing sensor). This means that the first vehicle speed sensing sensor 31 was decided to be out of order when the vehicle speed was found decelerated to a level over the given level even if the vehicle is not braked.

The decision is made to the effect that the second vehicle speed sensing sensor 35 is erred in an amount of alteration of the vehicle speed detected, like the first vehicle speed sensing sensor 31, when the brake switch 39 is OFF and the second vehicle speed sensing sensor 35 detects a degree of deceleration expressed by $|dV_2/dt| > a$ (constant) (where $V'$ denotes a vehicle speed detected by the second vehicle speed sensing sensor). This likewise means that the second vehicle speed was decided to be out of order when the vehicle speed was found to be decelerated over a given level regardless of no braking.

If a first value detected by the first vehicle speed sensing sensor 31 would be different from a second value detected by the second vehicle speed sensing sensor 35. i.e., if the relationship between the first and second values could be expressed by $|V_1 - V_2| > b$ (constant), it is decided that either of the first or second vehicle speed sensing sensor 31 or 35 is out of order regardless of which sensor is at least broken.

A concurrent trouble with both the first and second vehicle speed sensing sensors 31 and 35 is decided to have been occurred if a signal from the L terminal 41 of the alternator is "High (Hi)", if outputs from the two sensors 31 and 35 are both zero ($V_1 = V_2 = 0$), as well as if a state in which the neutral switch 37 is ON is continued for a constant period of time in the case of a vehicle with a manual transmission and if a state in which the inhibitor switch 38 is OFF, the engine switch 40 is ON, and the brake switch 39 is OFF is continued for a constant period of time for a vehicle with an automatic transmission. In other words, if the vehicle speed was detected "zero" by both the first and second vehicle speed sensing sensors 31 and 35, regardless of a runnable number of revolutions of the engine when judged from the amount of electric power generated and a running state when judged from the shift position, it means that the first and second sensors 31 and 35 cause a trouble.

Rear wheel steering mechanism system:

If it were decided that a trouble would occur in the rear wheel steering mechanism system, measures are taken to compete with the trouble in accordance with the mode B.

If there would be an inconsistency of an output (EN) from the encorder 32 with an output from the rear-wheel's steered-angle sensing sensor 36, i.e., a steered angle of the rear wheel ($\theta_R$), namely, if the relationship between the outputs from the encorder 32 and the sensor 36 is expressed by $|f(EN) - G(\theta_R)| > c$ (constant), it is decided that a trouble has occurred in the rear wheel steering mechanism system.

Alternatively, if there would be an inconsistency of a target steered angle of the rear wheel ($\theta r$) with the actual steered angle of the rear wheel ($\theta_R$), namely, if there is the relationship between the target steered angle of the rear wheel and the actual steered angle thereof expressed by $|\theta r - \theta_R| > c$, it is decided that the rear wheel steering mechanism system causes a trouble.

The rear wheel steering mechanism system is also decided to cause a trouble if a reference center position of the rear wheel could not be determined at the time of initializing the control when the engine key was inserted and turned on.

DC servo motor system:

When it is decided that a trouble occurs in the DC serbo motor system on the following occasions, measures are taken to deal with the trouble in accordance with the mode B above.

It is decided that the DC servo motor system causes a trouble if there is an inconsistency of a control amount with an amount of revolution of the motor 20. i.e., a value detected by the encorder 32.

Furthermore, the DC servo motor system is decided to cause a trouble if a motor coil is broken or shorted, if a harness is broken or shorted, or if the motor drive circuit is broken.

Rear-wheel's steered-angle sensing sensor system:

If a trouble were decided to occur in the rear-wheel's steered-angle sensing sensor system, measures are taken to compete with the trouble in accordance with the mode B.

The sensor system is decided to cause a trouble as a rotary encorder monitor is erred if a code generated from the encorder 32 is found abnormal.

Furthermore, the sensor system is decided to cause a trouble when the rear-wheel's steered-angle sensing sensor monitor is erred on the occasion that an output generated from the rear-wheel's steered-angle sensing sensor 36 exceeds a set range.

Front-wheel's steered-angle sensing sensor system:

The front-wheel's steered-angle sensing sensor system is decided to cause a trouble on the following occasions, and measures are taken to deal with the trouble in accordance with the mode A.

This decision is made when an output generated by a steering-wheel's steered-angle sensing sensor 30 exceeds a set range or when an output generated by a front-wheel's steered-angle sensing sensor 36 exceeds a set range.

Furthermore, when a difference between the outputs from the steering-wheel's steered-angle sensing sensor 30 and the front-wheel's steered-angle sensing sensor 36 is over a constant value, the front-wheel's steered-angle sensing sensor system is decided to be out of order.

Disconnection operation of clutch:

When it is decided that a disconnection operation of the clutch 22 of the electromagnetic type is defective, measures are taken in accordance with the mode A.

The decision is made to the effect that the disconnection operation of the clutch 22 is out of order when an OFF signal is generated to the clutch 22 to disconnect it and when an output of the rear-wheel's steered-angle sensing sensor 36 deviates over a constant value.

Control unit system:

If it is decided that the control unit system is out of order, measures are taken in accordance with the mode B.

The control unit system is decided to be out of order when a RAM is erred or found abnormal in checking the reading or writing therein, when a ROM is erred or found abnormal in checking the read-out, or when a FRC is erred or found abnormal in the initial check.

Furthermore, it is decided that the control unit is out of order when an abnormality is found upon checking an input/output of the A/D converter 52.

Microprocessor system:

It is decided that the microprocessor system is out of order on the following occasions.

The microprocessor system is decided to be out of order when there is an inconsistency of an operation result of the microprocessor MP1 with an operation result of the microprocessor MP2 or when a communication interconnection between the microprocessors MP1 and MP2 does not work.

Brake:

When it is decided that the brake 23 does not work, measures are taken to compete with the trouble in accordance with the mode B.

Whether the brake 23 is out of order is decided when the motor 20 is locked by the brake 23 and when no output is generated from the encorder 32 and the sensor 36 during a control for rotating the motor 20 in such a state that the brake 23 is unlocked. No output from the encorder 32 and the sensor 36 means the case where no rear wheels 2R and 2L are steered.

Furthermore, the brake 23 is decided to be out of order when the motor 20 cannot be locked by the brake 23 or when an output is generated from the encorder 32 and the sensor 36 (the rear wheels 2R and 2L have been steered) during the control for locking the brake 23 as well as during the control for rotating the motor 20.

Overall Control (FIG. 9)

An initial check to be carried out at the start-up of the engine and a detail of control in accordance with the checked result will be described in conjunction with flowcharts as shown in FIGS. 7 to 10.

Figure 9A:
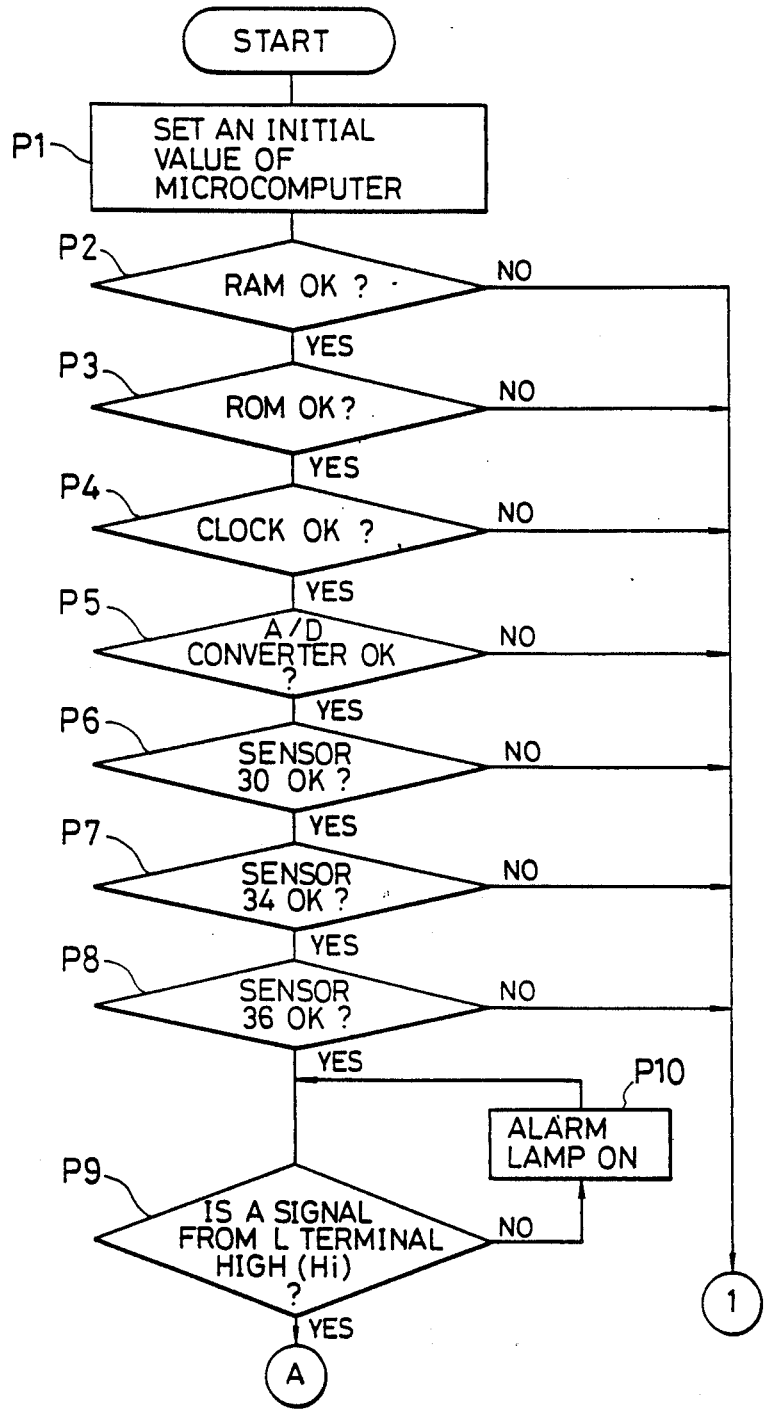
Figure 9B:
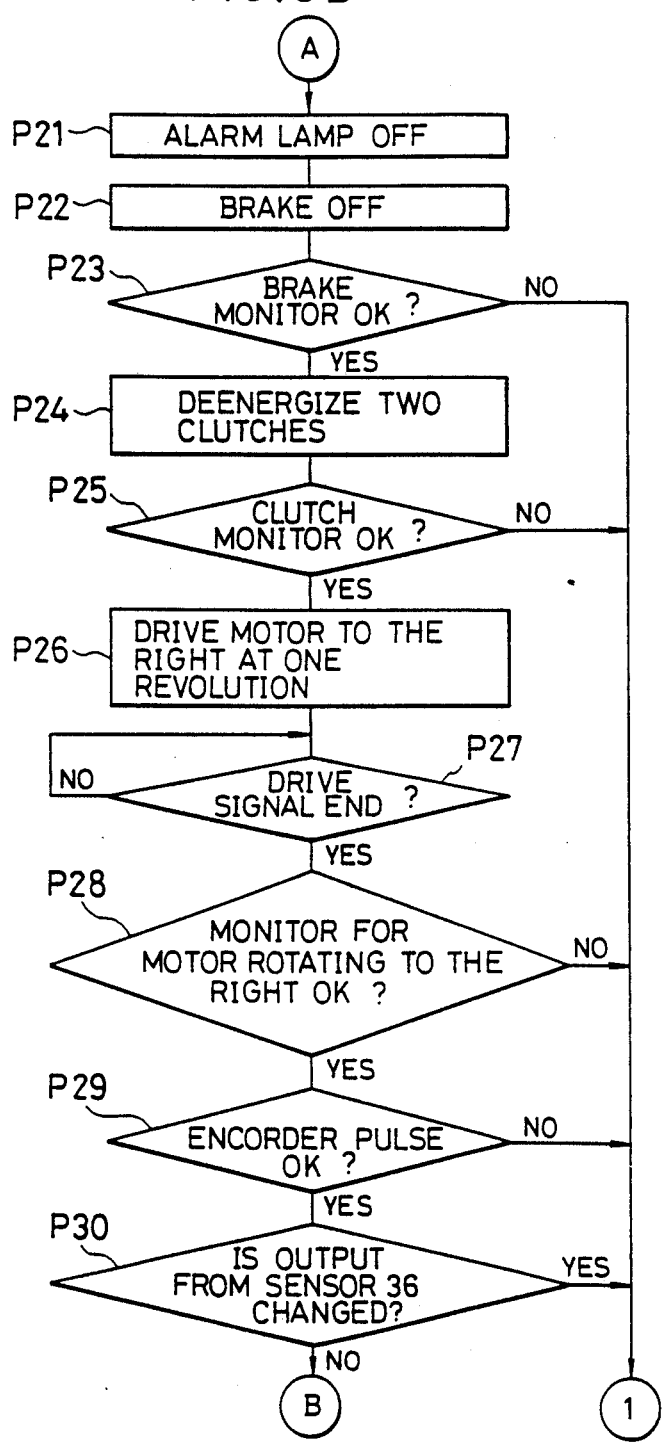
Figure 9C:
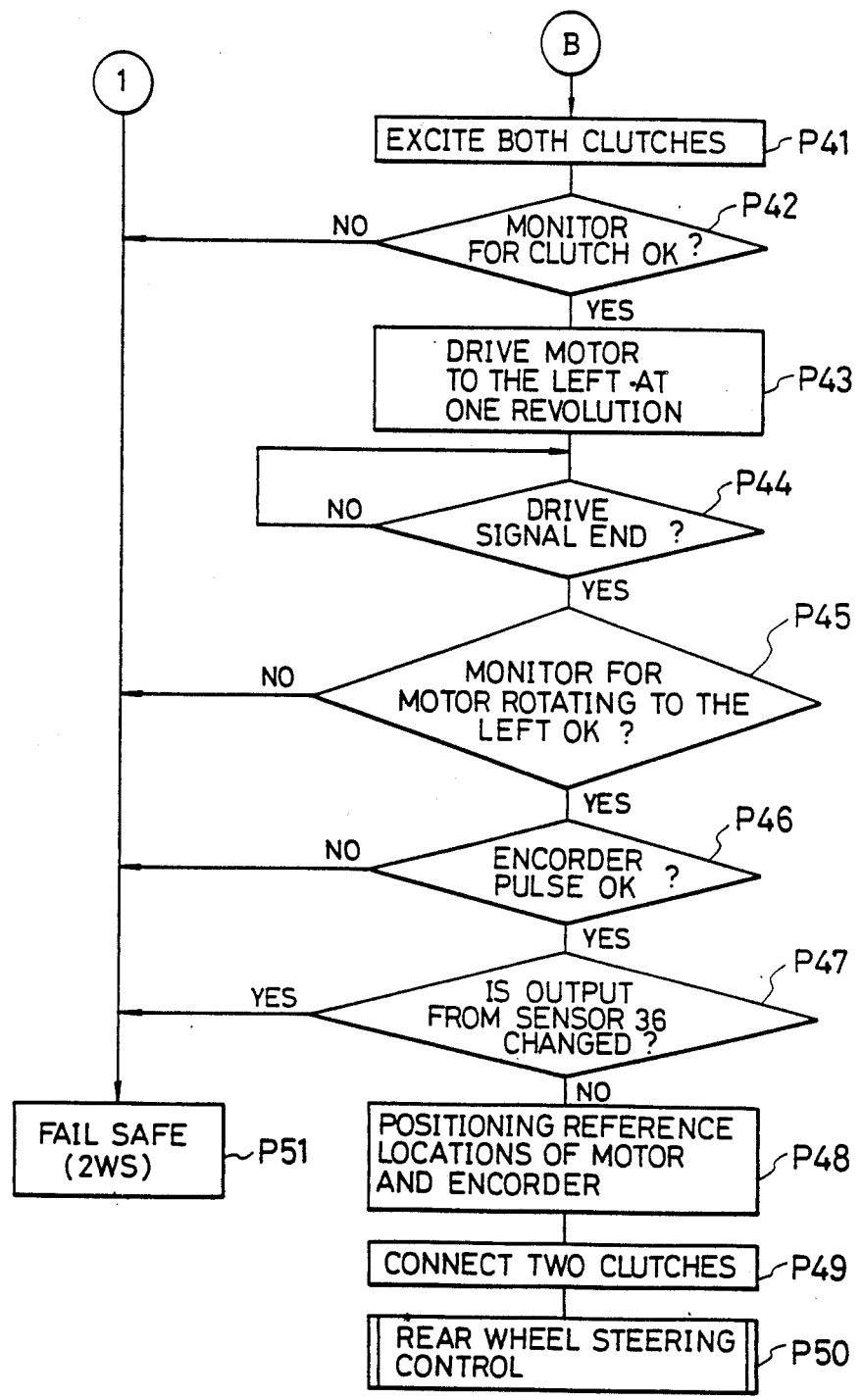

FIGS. 9(a) to 9(c) are each a flowchart showing an overall control system.

As shown in FIG. 9(a), the system starts as an ignition switch is turned on and an initial value of the microcomputer is set at step P1.

It is then decided by the initial checking in a CPU in known manner whether or not each of a RAM, a ROM, and a CLOCK is working normally at steps P2. P3, and P4, respectively. After it is decided that all of the RAM. ROM, and CLOCK are normally operated, namely, when it is decided YES at all of the steps P2, P3, and P4, then it is then judged at step P5 whether or not an A/D converter 52 is normally operated. If YES at step P5, the flow proceeds to step P6 where it is decided whether or not the sensor 30 for detecting an actual steered angle of the right-hand rear wheel 2R is normal. If it is decided to be normal at step P5, it is judged at step P6 whether or not the sensor 34 for detecting an actual steered angle of the left-hand rear wheel 2L is normal. If the sensor 34 is also decided to be normal, the flow proceeds to step P8 where it is judged whether or not the sensor 36 is normal. When it is decided YES at step P8, then it is judged at step P9 whether or not the L terminal of the alternator is "High (Hi)".

If NO at step P9, if it is judged that the L terminal is "Low (Lo)", the flow proceeds to step P10 and the alarm lamp is turned on to let the driver to draw attention that the engine is not started up yet. The flow is then returned to step P9.

When the the L terminal becomes "High (Hi)" as the engine started up, the alarm lamp is turned off at step F21 and the brake 23 is turned to an OFF state, i.e., to an unoperative state at step P22. Thereafter, at step P23, it is judged whether or not a brake monitor is OK. In other words, it is judged therein whether or not an output from a monitor circuit incorporated into an electromagnetic coil of the brake 23 corresponds to an OFF state of the brake at previous step P22.

If YES at step P23, coils of both the first and second clutches 22A and 22B are deenergized at step P24. In this case, the first clutch 22A of the normal open type is disconnected. Thereafter, at step P25, it is judged whether or not a clutch monitor is OK. namely, whether or not an output from a monitor circuit incorporated independently from each other into the coils of the first and second clutches 22A and 22B corresponds to an operation signal generated when the coils of the clutch 22 is deenergized at step P24.

When it is decided that the clutch monitor is OK at step P25, the flow proceeds to step P26 where a signal is generated in order to drive the motor 20 in one rightward revolution, and, after it is confirmed at step P27 that the drive signal generated at step P26 ended, it is then distinguished at step P28 whether or not a monitor for the rightward rotation of the motor 20 is OK, i.e., whether or not an output generated from the monitor circuit incorporated into a coil for the rightward rotation of the motor 20 corresponds to the output of the drive signal for the rightward rotation at step P26.

Figure 11:
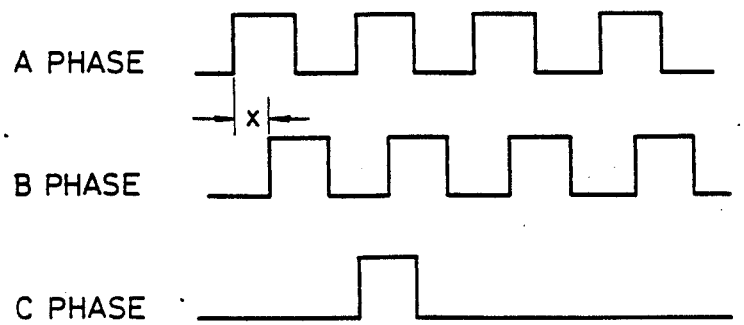
FIG. 11 is a diagram showing output pulses from the encorder as the rotational position means of the motor.
Figure 12:
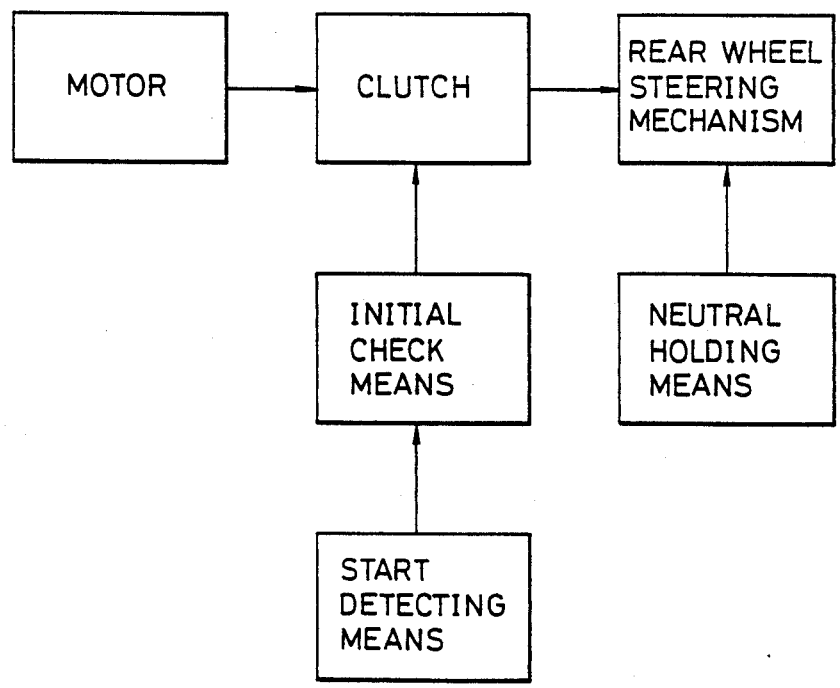
FIGS. 12 to 14 are each a block diagram showing the construction of the present invention.
Figure 13:
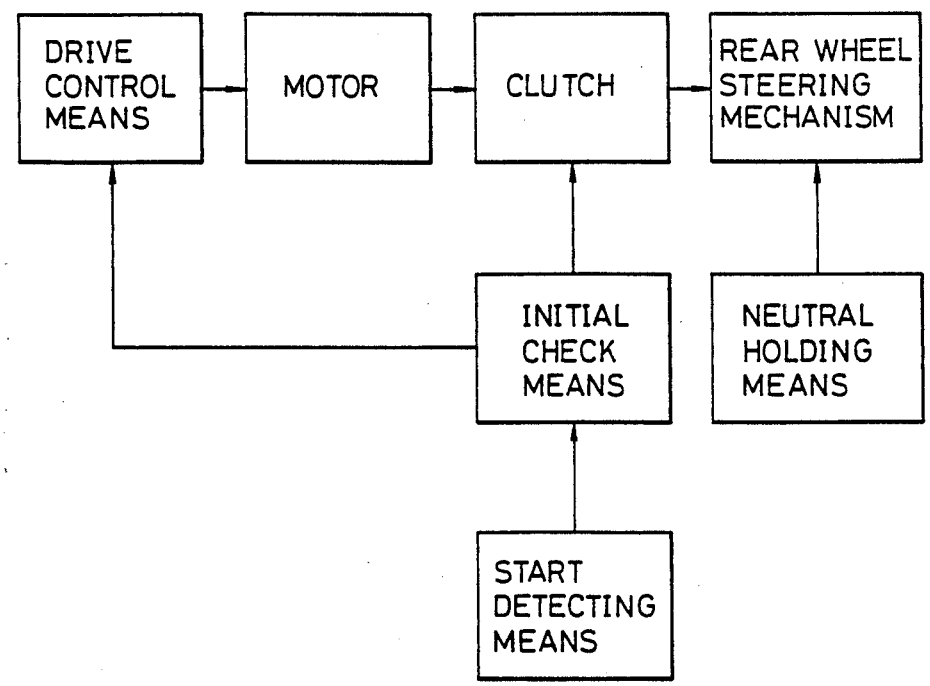
Figure 14:
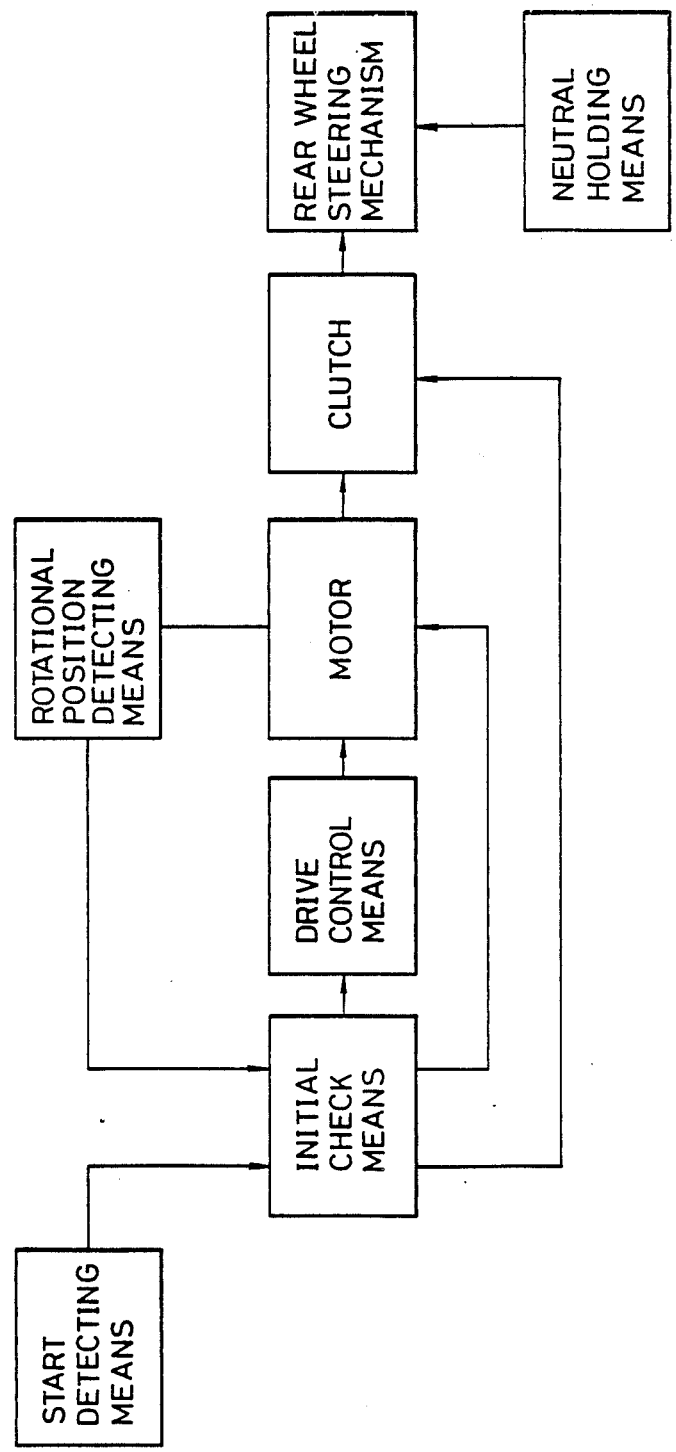

If YES at step P28, it is judged at step P29 whether or not an output pulse generated from the encorder 32 for detecting an actual rotational position of the motor 20 is normal. The output pulse from the encorder 32 is generated in three different kinds such as A phase pulse, B phase pulse, and C phase pulse, as shown in FIG. 11. As the motor 20 is rotated to the right, the A phase pulse is designed to rise earlier by a phase difference "X" than the rising of the B phase pulse and the C phase pulse is designed to generate one pulse only when the motor 20 is rotated in one full revolution. Accordingly, at the decision of step P29, the output pulse from the encorder 32 is decided to be normal when the pulse of the B phase appears late by the phase difference "X" after the pulse of the A phase and, furthermore, when a pulse of the C phase appears.

If it is decided YES at step P29, then it is distinguished at step P30 whether or not an output ($\theta_R$) from the actual steered-angle sensing sensor 36 for the rear wheels 2R and 2L changes. In this case, as the clutch 22 is to be disconnected, the output from the sensor 36 should not change even if the motor 20 is rotated. When it is decided that the output ($\theta_R$) does not change, the system is decided to be normal.

When it is decided at step P30 that the output from the sensor 36 did not change, i.e., if NO at step P30, the flow proceeds to step P41 where the first and second clutches 22A and 22B are both deenergized in this case; the second clutch 22B of the normal closed type should be disconnected. Thereafter, at step P42, it is judged whether or not the clutch monitor is OK like step P25.

If YES at the decision of step P42, the judgment from steps P43 to P47 is carried out in substantially the same manner with the exception that the motor 20 is rotated to the left in one revolution. It is further to be noted that the A phase pulse is confirmed that it rises later by the phase difference "X" than the B phase pulse.

When it is decided at step P47 that an output of the sensor 36 did not change, i.e., if NO at step P47, the flow proceeds to step P48 where a reference position of the motor 20 coincides with the reference position of the encorder 32. The positioning may be effected, for example, by rotating the motor 20 to the right or to the left and suspending the rotation of the motor 20 at the point of time when the C phase pulse as shown in FIG. 11 appears. This positioning permits an appearance of the C phase pulse whenever the motor 20 is rotated to the right or left in one revolution. After step P47, the first and second clutches 22A and 22B are connected to each other, and the rear wheel steering control is then carried out at step P50.

Figure 10:
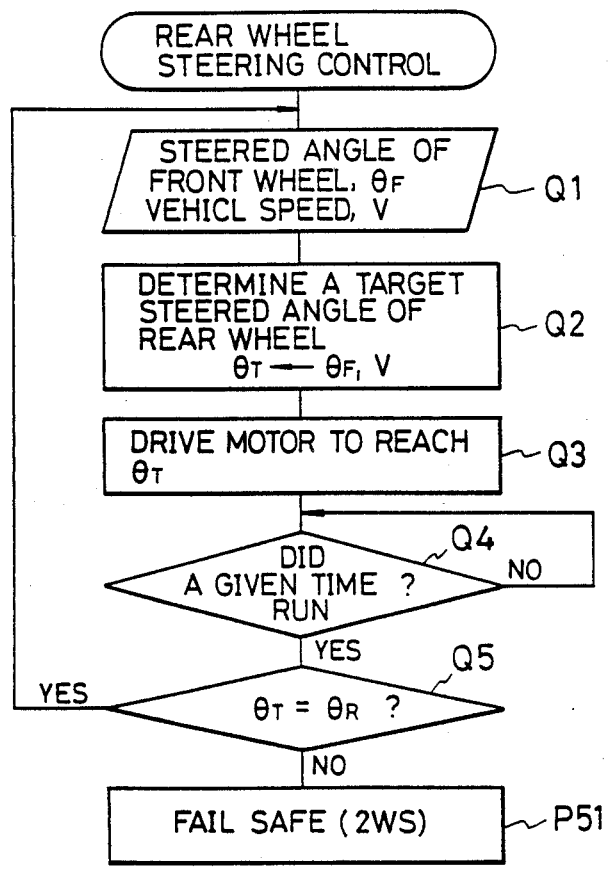

Rear Wheel Steering Control (FIG. 10):

The rear wheel steering control at step P50 may be carried out in accordance with the flowchart as shown in FIG. 10.

At step Q1, an actual steered angle of the front wheels 1R and 1L. $\theta_F$, and a vehicle speed V are read in. It is to be noted herein that the front-wheel's steered angle $\theta_F$ uses an output value whichever is smaller, an output from the sensor 30 or from the sensor 34, namely, an output value at which the steered angle of the front wheel appears smaller, and that this is preferred because a steered angle of the rear wheels 2R and 2L is not required to become unnecessarily larger. If a difference between the output values from the sensors 30 and 34 becomes larger so as to exceed an acceptable range, the flow proceeds to the fail safe mode at step P61.

After step P2, a target steered angle for the rear wheel, $\theta_T$, is decided on the basis of the vehicle speed V and the front-wheel's actual steered angle, $\theta_F$, with reference to a map as shown in FIG. 4 or FIG. 5. Thereafter, at step Q3, the motor 20 is driven to realize the rear-wheel's target steered angle $\theta_T$ by means of the feedback control utilizing the output from the sensor 36. Then at step Q4, it is judged whether or not a given period of time runs. The given period of time is preset with the prospect of a delay in reaching the actual steered angle of the rear wheels 2R and 2L to amount to the target steered angle $\theta_T$. If it is decided at step Q4 that the given period of time has run, the flow proceeds to step Q5 where it is distinguished whether the target steered angle $\theta_T$ for the rear wheels 2R and 2L coincides with the rear-wheel's actual steered angle $\theta_R$ detected by by the sensor 36. If it is decided that $\theta_T = \theta_R$, the flow returns to step Q1 to repeat the processing.

If it is decided that $\theta_T$ is equal to $\theta_R$, then the flow proceeds to the fail safe mode at P51 as shown in FIG. 9(c). In this case, the target steered angle $\theta_T$ is not realized for some reasons, for example, on account of an out-of-order of the sensor 36.

Fail Safe Mode:

This processing corresponds to step P51 in FIG. 9. The fail safe mode may be carried out in two modes, processing modes A and B.

Processing Mode A:

At step S1, an alarm lamp is turned on to let the driver learn of abnormality in a system. Then it is checked whether the rear wheel control is carried out in a normal way at step S2 and whether the judgment of a position of the rear wheel is implemented normally at step S3. In other words, at step S2, it is distinguished whether or not the sensor 36 for sensing a steered angle of the rear wheel works normally and, if YES at step S2, it is further distinguished whether or not the encorder 32 is normal at step S3. If it is decided at step S3 that the encorder 32 works in a right way, then the flow proceeds to step S4 where the right-hand and left-hand rear wheels 2R and 2L are gradually returned to their neutral positions by controlling the motor 20. Thereafter, at step S5, it is judged whether or not the motor 20 operates normally. And when YES at step S5, it is further confirmed at step S6 that the rear wheels 2R and 2L are actually both at a neutral position. If it is confirmed at step S6 that the rear wheels 2R and 2L are at a neutral position, the brake is operated at step S7 locking the operation of the motor in such a state that the rear wheels 2R and 2L are located at a neutral position. At this time, the clutch 22 is kept connected so that the rear wheels 2R and 2L are securely held at the neutral position by means of an urging force by the neutral holding means 13, a resistance from the motor 20 through the deceleration mechanism 23 as well as a locking action by the brake 23.

When it is decided NO at either of steps S2, S3 or S5, it is when the rear wheels 2R and 2L cannot be returned to the neutral position correctly. In this case, the flow proceeds to step S11 in Processing Mode B.

Processing Mode B:

At step S10, the alarm lamp is turned on and, an step S11, the clutch 22 is disconnected so that the rear wheels 2R and 2L are forcibly returned to the neutral position by the neutral holding means 13. Thereafter, at step S12, the brake 23 is operated to lock the motor 20. Then at step S13, an application of electricity to the motor is suspended in order to prevent the motor 20 from running without control. At step S14, it is judged whether or not a constant period of time has run with a time required for returning the rear wheels 2R and 2L to the neutral positions taken into consideration. If it is decided at step S14 that the constant period of time has run, the clutches 22 are connected again in order to hold them securely at the neutral position.

Embodiments according to the present invention may be all directed to a steered angle of a front wheel as a parameter, i.e., of the type operative with a steered angle in order to determine a target steered angle of the rear wheel.

The invention may be embodied in other specific forms without departing from the spirit and scope thereof. The present embodiments are therefore to be considered in all respects as illustrative and not restrictive, the scope of the invention being indicated by the appended claims, and all the changes which come within the meaning and range of equivalency of the claims are therefore intended to be emcompassed within the spirit and scope of the invention.

What is claimed is:

1. A rear wheel steering apparatus comprising:
   a rear wheel steering mechanism for steering rear wheels;
   a neutral holding means for holding the rear wheel steering mechanism always at a neutral position, which is connected to the rear wheel steering mechanism;
   a motor as a driving source connected to the rear wheel steering mechanism and arranged for displacing the rear wheel steering mechanism in resistance to the neutral holding means;
   a clutch being interposed between the rear wheel steering mechanism and the motor and arranged for connecting or disconnecting the rear wheel steering mechanism to or from the motor;
   a start detecting means for detecting the turning of an ignition switch on; and
   an initial check means for carrying out an initial check of a drive control system of the motor to determine the absence or presence of any abnormality therein including the motor by disconnecting the clutch when the start detecting means detects that the ignition switch is turned on.

2. A rear wheel steering apparatus as claimed in claim 1, further comprising a drive control means for controlling drive of the motor so as to allow a steered angle of the rear wheels to reach a target steered angle of the rear wheels determined in accordance with a predetermined condition;
   in which the intial check means is set to re-connect the clutch when the drive control system is found to be in proper order; and
   the drive control means is operated subsequent to the re-connection of the clutch after the drive control system is found to be in proper order.

3. A rear wheel steering apparatus as claimed in claim 2, wherein the intial check means is set to determine the absence or presence of abnormality in the motor by rotating the motor subsequent to the disconnection of the clutch.

4. A rear wheel steering apparatus as claimed in claim 1, wherein:
   a drive control means for controlling drive of the motor so as to allow a steered angle of the rear wheels to reach a target steered angle of the rear wheels determined in accordance with a predetermined condition; and
   a rotational position detecting means for detecting a rotational position of the motor;
   in which the intial check means is set to re-connect the clutch subsequent to alignment of a reference rotational position of the motor with a reference rotational position of the rotational position detecting means to be made after the clutch is disconnected; and
   the drive control means is operated subsequent to the re-connection of the clutch by the initial check means.

5. A rear wheel steering apparatus as claimed in claim 2, further comprising a steered-angle detecting means for detecting an actually steered angle of the rear wheel;
   in which the initial check means is further set to determine the absence or presence of abnormality in the clutch; and
   the initial check means checks the clutch by rotating the motor in a state in which the clutch is disconnected and monitors whether or not a steered angle detected by the steered-angle detecting means is varied with rotation of the motor.

6. A rear wheel steering apparatus as claimed in claim 5, further comprising a fail control means for servo-locking the motor after the rear steel steering mechanism is turned to a neutral position by rotating the motor when the initial check means detects abnormality in the clutch.

7. A rear wheel steering apparatus as claimed in claim 6, further comprising a brake for locking a rotation of the motor;
   in which the fail control means locks the rotation of the motor by the brake in addition to the servo-locking of the motor.

8. A rear wheel steering apparatus as claimed in claim 3, further comprising a fail control means for blocking an electric source to the motor when the initial check means detects abnormality in the motor.

9. A rear wheel steering apparatus as claimed in claim 8, wherein the fail control means is to connect the clutch after the electric source to the motor is blocked.

10. A rear wheel steering apparatus as claimed in claim 9, further comprising a brake for locking the motor;
    in which the fail control means is to operate the brake after the clutch is connected.

11. A rear wheel steering apparatus as claimed in claim 2, wherein the initial check means determines the absence or presence of abnormality in the drive control means.

12. A rear wheel steering apparatus as claimed in claim 11, wherein a fail control means is further disposed for blocking an electric source to the motor when the initial check means determines the presence of abnormality in of the drive control means.

13. A rear wheel steering apparatus as claimed in claim 12, wherein the fail control means is to connect the clutch after the electric source to the motor is blocked.

14. A rear wheel steering apparatus as claimed in claim 13, further comprising a brake for locking the motor;
    in which the fail control means is to operate the brake after the clutch is connected.

15. A rear wheel steering apparatus as claimed in claim 3, wherein the initial check means determines the absence or presence of any abnormality of the motor by rotating the motor in alternatively rotational directions.

16. A rear wheel steering apparatus as claimed in claim 15, wherein the clutch comprises a first clutch and a second clutch which are arranged in a series with each other; and the initial check means rotates the motor in one given rotational direction in a state that only one of the first clutch and the second clutch is disconnected and then rotates the motor in the other direction after the other of the first clutch and the second clutch is disconnected.

17. A rear wheel steering apparatus as claimed in claim 16, wherein the first clutch and the second clutch are each of an electromagnetic type;

in which one of the first clutch and the second clutch is of a normal open type in which the one is disconnected when deenergized, and the other is of a normal closed type in which the other is connected when deenergized.

18. A rear wheel steering apparatus as claimed in claim 2, wherein the target steered angle of the rear wheel is determined on the basis of a steered ratio characteristic set with a steered angle of a front wheel and a vehicle speed used as a parameter.

19. A rear wheel steering apparatus as claimed in claim 18, further comprising a rotational position detecting means for detecting a rotational position of the motor;

in which the drive control means implements a feedback control over the motor so as to allow the rotational position of the motor detected by the rotational position detecting means to correspond to the target steered angle of the rear wheel.

20. A rear wheel steering apparatus as claimed in claim 3, wherein the target steered angle of the rear wheel is determined on the basis of a steered ratio characteristic set with the steered angle of the front wheel and the vehicle speed as a parameter.

21. A rear wheel steering apparatus as claimed in claim 20, further comprising a rotational position detecting means for detecting a rotational position of the motor;

in which the drive control means implements a feedback control over the motor so as to allow the rotational position of the motor detected by the rotational position detecting means to correspond to the target steered angle of the rear wheel.

22. A rear wheel steering apparatus as claimed in claim 7, wherein the brake is disposed on the side proximate the motor than the clutch.

23. A rear wheel steering apparatus as claimed in claim 10, wherein the brake is disposed on the side proximate the motor than the clutch.

24. A rear wheel steering apparatus as claimed in claim 14, wherein the brake is disposed on the side proximate the motor than the clutch.

25. A rear wheel steering apparatus comprising:

a rear wheel steering mechanism for steering rear wheels;

a neutral holding means for holding the rear wheel steering mechanism always at a neutral position, which is connected to the rear wheel steering mechanism;

a motor as a driving source connected to the rear wheel steering mechanism and arranged for displacing the rear wheel steering mechanism in resistance to the neutral holding means;

a clutch being interposed between the rear wheel steering mechanism and the motor and arranged for connecting or disconnecting the rear wheel steering mechanism to or from the motor;

a start detecting means for detecting the turning of an ignition switch on;

an initial check means for carrying out an initial check of a drive control system of the motor including the motor to determine the absence or presence of any abnormality therein by disconnecting the clutch when the start detecting means detects that the ignition switch is turned on; and a drive control means for controlling drive of the motor to allow a steered angle of the rear wheel to reach a target steered angle of the rear wheel determined in accordance with a predetermined condition;

in which a drive control over the motor by the drive control means is commenced by re-connecting the clutch when no abnormality in the drive control system is detected by the initial check means or a drive control over the motor by the drive control means is inhibited when abnormality in the drive control system is detected thereby.

26. A rear wheel steering apparatus as claimed in claim 25, wherein:

a brake is disposed for locking the motor on the side proximate the motor than the clutch; and the clutch is set to be re-connected subsequent to operation of the brake in a state in which the clutch is disconnected when abnormality in the drive control system is detected by the initial check means.

27. A rear wheel steering apparatus as claimed in claim 25, wherein the clutch comprises a first clutch and a second clutch which are arranged in a series with each other and which are each of an electromagnetic type;

in which one of the first clutch and the second clutch is of a normal open type in which the one is is disconnected when deenergized, and the other is of a normal closed type in which the other is connected when deenergized.

* * * * *